Figure 2:
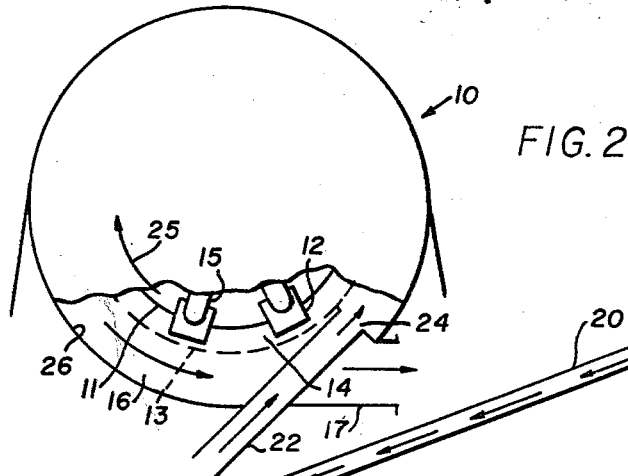

May 18, 1965 J. KERESZTESY 3,184,170
GAS SWEPT PULVERIZER
Filed April 2, 1963

INVENTOR
JOHN KERESZTESY
BY— Smart & Biggar
ATTORNEYS.

United States Patent Office 3,184,170
Patented May 18, 1965

3,184,170
GAS SWEPT PULVERIZER
John Keresztesy, Ottawa, Ontario, Canada, assignor to Universal Milling and Machinery Limited, Ottawa, Ontario, Canada
Filed Apr. 2, 1963, Ser. No. 269,925
Claims priority, application Great Britain, Apr. 10, 1962, 13,800/62
9 Claims. (Cl. 241—73)

This invention relates to the operation of pulverizing machinery for comminuting or reducing materials and to the recovery of comminuted or milled product from air or gaseous fluid used for conveying the milled product from the machinery.

Heretofore the pulverizing of a wide variety of materials by known forms of pulverizing machines, such as hammermills, was attended by certain difficulties in screening the materials and such machines proved relatively inefficient as evidenced by low output in terms of pounds of milled product per horsepower hour of work expended. A serious disadvantage has been the packing or bridging of comminuted materials on the surfaces of sizing screens and the collecting of such materials on the back or outside of such screens.

According to one aspect of the present invention a pulverizing machine, provided with a sizing screen for the milled product, is adapted so that air or other gas may be caused to flow at high velocity over the back of the screen to carry away comminuted product flowing through the screen.

According to another aspect of the invention a pulverizing machine, provided with a cylindrical or part-cylindrical sizing screen for the milled product and means for maintaining a pressure drop across the screen, is adapted so that air or other gas may be directed at high velocity substantially tangentially to the screen and caused to flow circumferentially thereabout. It has been found that the high velocity gas flow over the back (i.e. the outside) of the screen helps substantially to avoid collection of milled product on the back of the screen.

The present invention has application to hammermills wherein a rotor, which supports a plurality of striking blades for rotation in close proximity to the sizing screen, is formed as an impeller which serves to maintain a high velocity circulatory gas flow within a comminuting zone bounded by the sizing screen together with a high pressure gradient across the screen. Such a hammermill is described in detail in co-pending British patent application No. 30,493/61 (and also in Canadian patent application Serial No. 822,905, filed May 6, 1961, by Universal Milling and Machinery Limited, and in United States patent application Serial No. 127,627, filed July 28, 1961, by Leslie Palyi, now Patent No. 3,123,312). It has been found that such high circulatory velocity and such pressure drop leads to a high efficiency of pulverizing action and reduces clogging of the sizing screen. In the application of this hammermill to the present invention the pressure drop across the screen avoids the gas blown tangentially over the screen from blowing back through the screen into the comminuting chamber.

Heretofore recovery of minute particles of milled product being discharged from cyclone separator air outlets required complex equipment normally including either manually or automatically operated dust collectors or filters. Where such filters were not employed in combination with cyclone separators, a lesser or greater amount of material depending on the relative efficiency of the cyclone separator was lost if such separator was vented to open air. In addition to loss of a proportion of the milled product, such equipment vented to open air caused pollution of air frequently in contravention of municipal enactments. Where filter dust collectors were employed, a constant expenditure of energy was required to maintain a flow of air under pressure through the walls of the filter hoses and this energy requirement increased as the walls of the filter hoses clogged with fine particles thereby impeding the flow of such air. The effect of the inefficient operation of a filter was a direct loss of energy not only through heavier load upon the conveying fan and its motor but also caused a back pressure extending back to and impeding the operation of the pulverizing machine.

According to a further aspect of the invention, the comminuted product of a pulverizing machine is mixed with air or other gas and conveyed thereby to a cyclone separator, which separates most (for example 99%) of said product from the gas, and the gas discharged from the cyclone separator and containing some residual entrained product is returned to the pulverizing machine to mix with further product therefrom and so re-enter the cyclone separator and flow in closed circuit.

Preferably, the pulverizing machine is provided with a cylindrical or part-cylindrical sizing screen and means for maintaining a pressure drop thereacross, and the gas containing residual entrained product and returned to the pulverizing machine is directed substantially tangentially to the screen and caused to flow circumferentially thereabout as described above. The pressure drop across the screen may cause a small quantity of fresh gas to enter the closed circuit, which compensates for any gas loss which may occur through the material outlet of the cyclone separator and/or due to leaks.

To increase and control the gas flow through the sizing screen a vent conduit, provided with a valve may be connected to the closed circuit. The vent conduit preferably leads to filtering means for removing any fine particles which may be entrained in gas flowing through the vent conduit. Such filtering means need only be quite simple, such as an air bag, as compared with the elaborate and expensive filters of the above mentioned prior art systems wherein the whole of the gas leaving the cyclone separator is filtered, since only a comparatively small proportion of the gas flows through the vent conduit. By controlling the gas flow through the vent pipe the inflow of gas through the pulverizing machine, and therefore the temperature inside the pulverizing machine can be controlled. The vent conduit and valve may serve as an over-pressure relief device wherein the valve is normally kept shut but is pressure-responsive and opens automatically should the pressure in the closed circuit rise, leading to a risk of blowback through the sizing screen.

Figure 1:
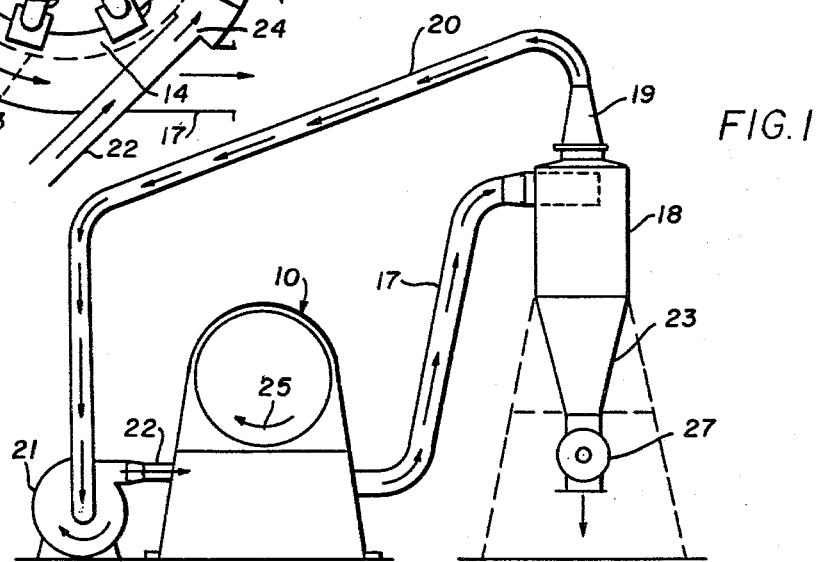
Figure 3:
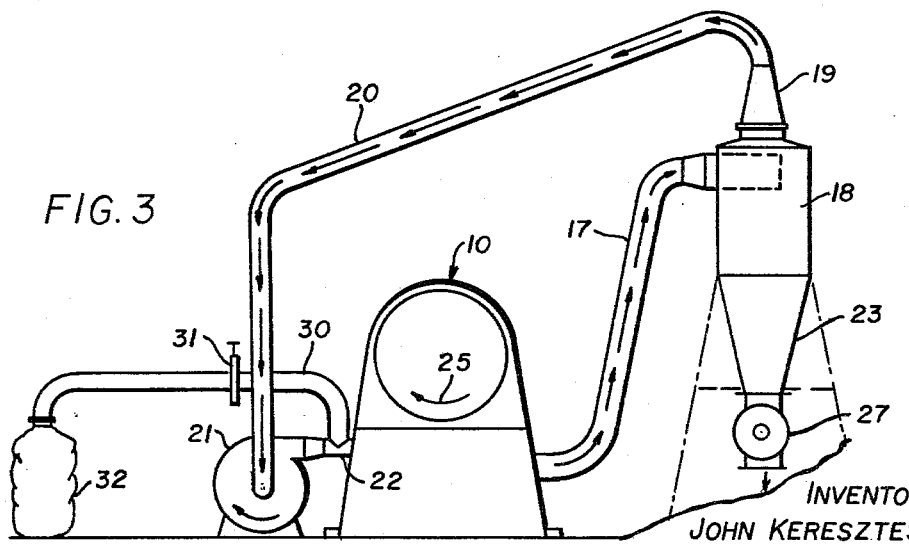

The invention will be further described by way of example with reference to the accompanying drawings wherein:

FIGURE 1 is a schematic elevation of a disintegrator equipped with a conveying system for conveying comminuted materials according to the invention, FIGURE 2 is a schematic elevation, partly broken, of the disintegrator itself, and FIGURE 3 is a schematic elevation similar to FIGURE 1 but showing a modification thereto.

Referring to FIGURE 1 of the drawings, there is diagrammatically indicated a disintegrator 10 constructed substantially as described in the above-mentioned co-pending British patent application No. 30,493/61. As described in detail in the said application, the rotor 11 (FIGURE 2) of the disintegrator supports a plurality of striking blades 12 which are rotated in close proximity to a sizing screen 13 bounding an annular comminuting chamber 14. The rotor is formed as an impeller with vanes 15 so that a high velocity circulatory flow of air or other gas in the comminuting chamber is maintained to assist in comminution of the material being milled and avoid or at least substantially reduce packing of the milled product on the inside surface of the screen. Some gas flows through the sizing screen and a pressure drop is maintained thereacross thereby helping to avoid build-up of comminuted material within the holes of the sizing screen.

The comminuted material passing through the screen 13 enters an annular chamber 16 surrounding the screen from where it leaves the disintegrator 10 through a conduit 17. The product material in the conduit 17 is conveyed therethrough to a cyclone collector or separator 18 by air or other gas which is sucked from the gas outlet 19 of the cyclone separator through a conduit 20 by a suction blower 21.

As can be seen from FIGURE 2, the gas supplied to the disintegrator 10 through the conduit 22 enters the annular chamber 16 through a tangentially directed nozzle 24 to flow through the chamber 16 circumferentially and leave the chamber 16 tangentially through the conduit 17. The circumferential gas flow in the chamber 16 scours the outside of the screen 13 and the inside of the outer cylindrical wall 26 of the chamber 16 and keeps them free from milled product. Preferably the direction of such circumferential flow is opposite to the direction of rotation of the rotor which is indicated by arrows 25.

Normally the air or other gas in the conduit 20 will still contain some entrained comminuted material due to incomplete separation in the separator 18. In prior art conveying systems such residual comminuted material was removed by a filter, thus creating an undesirable back pressure in the system, or was lost.

In the system of the present invention the outlet from the blower 21 is connected by a conduit 22 to the disintegrator 10. Thus the residual comminuted material entrained in the gas leaving the separator through the gas outlet 19 is mixed with the product material from the disintegrator and returned to the cyclone separator 18. Thus it will be seen that air or other gas used for conveying the comminuted material is continuously recirculated in a closed circuit. Some of the air or other gas performing the conveying leaves the circuit through the outlet 23 for comminuted material, which outlet may be provided with a rotary air valve 27. Additional air or other gas enters the circuit through the sizing screen 13 by virtue of the impeller action of the rotor 11 and the consequent pressure drop across the screen 13.

It has been found that by not venting the system to outside air or to a filter but by recirculating the high velocity gas being discharged from the gas outlet of the cyclone separator over the outer surface of the sizing screen and combining said flow with the discharge from the disintegrator in a continuous closed circuit with or without the aid of a coaxial or other type of fan results in a considerable increase in throughput of material coupled with a very considerable saving of energy. The invention obviates the necessity for the use of a filter dust collector. With the continuous uninterrupted flow and recirculation in the closed circuit, the system is capable of transporting milled products to greater distances both vertically and horizontally while at the same time the greater efficiency in transportation is achieved with the expenditure of a lesser amount of energy than was heretofore employed in systems using a single one-way or interrupted method of conveyance. Heretofore cyclone separators operating with maximum efficiency extracted the greater portion of the milled product from the conveying gas while an appreciable quantity was discharged into a filter dust collector requiring further collection and conveyance or was entirely lost owing to discharge into open air. With the use of the present closed circuit substantially one hundred percent extraction of conveyed product may be obtained through the cyclone separator.

The air flow in the closed system being directed through an appropriately designed nozzle in a circumferential direction adjacent to the outer side of the sizing screen performs the function of blowing fine milled particles from the outer surface of the sizing screen leaving it free for the discharge of milled product from the comminuting chamber, causing the collected milled product to flow with a centrifugal motion along the inner wall of the housing enclosing the sizing screen. The said flow of gas brushes and polishes the outer side of the sizing screen increasing its efficiency, and the centrifugal effect of the circumferential flow effects an atomizing or a suction action through the apertures in the sizing screen increasing the throughput of milled product through the apertures. The high velocity gas in the closed system also brushes and polishes all inside surfaces in the conveying system reducing friction and substantially avoiding packing. The even and controlled flow of gas and conveyed material through the closed circuit increases the effective efficiency of the cyclone separator and the small quantity of micron sized milled product particles recirculating from the cyclone separator into the pulverizing machine is trapped by the larger volume of conveyed milled product.

To provide a control of the gas velocity in the closed circuit a vent conduit 30 containing a valve 31 may be connected to the conduit 22 as shown in FIGURE 3, wherein parts like those shown in FIGURE 1 or having the same function are denoted by like reference numerals. The conduit 30 is vented to atmosphere through an air bag 32. The conduit 30 with the valve 31 and the air bag 32 constitute an over-pressure relief section for controlling the gas velocity in the closed circuit and thereby controlling the temperature inside the disintegrator and the quantity of air intake into the primary grinding unit.

This system, with the assistance of the fan or blower facilitates the continuous movement of the material from the pulverizing chamber through the apertures in the sizing screen from where it is conveyed with high velocity in a centrifugal manner around the outside of the sizing screen into the cyclone separator. With the reduction of velocity inside the cyclone separator, the collected material drops into a rotary air valve from where it is discharged ready for use. The gas used for conveying material into the cyclone separator having been separated from milled products rises out through the discharge outlet back to the fan and into the pulverizing machine in a continuous manner. A loss of approximately 20% in the volume of gas from the system occurs in each complete circuit partly through the rotary air valve discharge of the cyclone separator and partly through the air bag at the end of the overpressure discharge outlet to ensure that a sufficient quantity of new cold gas enters the pulverizing machine to provide continuous cool operation which is desirable in most milling applications.

What I claim is:

1. In a pulverizing machine having a sizing screen through which the pulverized product is passed and having a conduit leading from said screen to means for recovering the product, the improvement comprising a second conduit leading to said screen and means for feeding air or other gas at high velocity through said second conduit, said second conduit being adapted to direct the high velocity gas flow across the outer face of the screen to prevent build-up of the product on said outer face.

2. A pulverizing machine as claimed in claim 1, wherein the first and second conduits form parts of a closed circuit.

3. A pulverizing machine as claimed in claim 1, wherein said means for feeding air or other gas at high velocity to the second conduit is a suction blower.

4. A pulverizing machine as claimed in claim 1, wherein a third conduit is provided linking the discharge end of the first conduit with the entry to said second conduit.

5. A pulverizing machine as claimed in claim 1, wherein said sizing screen is cylindrical or arcuate and said second conduit is disposed tangentially thereto.

6. A pulverizing machine as claimed in claim 1, wherein means is provided for maintaining a pressure drop across the sizing screen.

7. A pulverizing machine comprising a cylindrical housing, a cylindrical sizing screen mounted concentrically within said housing, a rotor having a plurality of striking blades for rotation in close proximity to said screen, said rotor being formed as an impeller to maintain a high velocity circulating gas flow within a comminuting zone bounded by the sizing screen together with a high pressure gradient across the screen, a cyclone separator, a first conduit connecting said housing with said cyclone separator, a suction blower, a second conduit connecting said suction blower with said housing to discharge a high velocity flow of air or other gas into said housing tangentially to said screen to travel around same before entering said second conduit, and a third conduit connecting said cyclone separator back to said suction blower to form a closed circuit.

8. A pulverizing machine according to claim 7, wherein a vent conduit containing a valve is connected to the closed circuit to control the flow therein.

9. A pulverizing machine according to claim 8, wherein said vent conduit leads to an air bag.

References Cited by the Examiner
UNITED STATES PATENTS

| | | | |
|---|---|---|---|
| 2,474,314 | 6/49 | Koehne | 241—74 X |
| 2,959,362 | 11/60 | Smith et al. | 241—73 X |

FOREIGN PATENTS

| | | |
|---|---|---|
| 170,123 | 1/60 | Sweden. |

ANDREW R. JUHASZ, *Primary Examiner.*